US008593909B2

(12) United States Patent          (10) Patent No.:     US 8,593,909 B2
    Steiner et al.                 (45) Date of Patent:     Nov. 26, 2013

(54) METHOD AND APPARATUS FOR PASSIVE DETERMINATION OF TARGET PARAMETERS

(75) Inventors: Hans-Joachim Steiner, Bremen (DE); Ulrich Steimel, Oyten (DE)

(73) Assignee: Atlas Elektronik GmbH, Bremen (DE)

( * ) Notice: Subject to any disclaimer, the term of this patent is extended or adjusted under 35 U.S.C. 154(b) by 288 days.

(21) Appl. No.: 13/000,489

(22) PCT Filed: Jun. 19, 2009

(86) PCT No.: PCT/EP2009/057655
§ 371 (c)(1),
(2), (4) Date: Dec. 21, 2010

(87) PCT Pub. No.: WO2009/156337
PCT Pub. Date: Dec. 30, 2009

(65) Prior Publication Data
US 2011/0103190 A1    May 5, 2011

(30) Foreign Application Priority Data

Jun. 25, 2008 (DE) .......................... 10 2008 030 053

(51) Int. Cl.
*G01S 11/04* (2006.01)
*G01S 11/14* (2006.01)

(52) U.S. Cl.
USPC ............................ 367/124; 367/118; 367/131

(58) Field of Classification Search
USPC .................................. 367/118, 120, 127, 124
See application file for complete search history.

(56) References Cited

U.S. PATENT DOCUMENTS 4,558,439 A * 12/1985 Gudesen ........................ 367/127

(Continued)

FOREIGN PATENT DOCUMENTS

DE    3446658    11/1988
(Continued)

OTHER PUBLICATIONS

Sorensen et al. "Likelihood, Bayesian and MCMC methods in Genetics", Springer, Secaucus NJ, USA Aug. 2002, p. 85, eisbn 9780387227641.*
Frédérick Bavencoff, et al, "Constrained Bearings-Only Target Motion Analysis via Markov Chain Monte Carlo Methods", IEEE Transactions on Aerospace and Electronic Systems, vol. 42, No. 4, pp. 1240-1263, Oct. 2006 France.

*Primary Examiner* — Isam Alsomiri
*Assistant Examiner* — Hovhannes Baghdasaryan
(74) *Attorney, Agent, or Firm* — Fitch, Even, Tabin & Flannery, LLP

(57)    ABSTRACT

A method and an apparatus for passive determination of target parameters by directionally selective reception of sound waves emitted or transmitted from a target, by an arrangement (24) of underwater sound sensors of a sonar receiving installation from estimated bearing angles determined from estimated positions of the target, and bearing angles measured at the measurement point by the arrangement (24). A bearing angle difference between measured and estimated bearing angles is iteratively minimized and, when the minimum is reached, the target parameters are used for an optimized solution for outputting target position, course, range and/or velocity and they are updated during each processing cycle in a series of successive processing cycles. To estimate the reliability of this optimized solution, during each processing cycle a multiplicity of different target tracks Z(i,j) are calculated from possible solutions for the target parameters to be determined, specifically an assumed target course $C_{est}$, an assumed target range $R_{est}$ and/or an assumed target velocity $V_{est}$. Associated bearing angles $B_{est}$ are assumed for each of the possible solutions, and the assumed bearing angles $B_{est}$ are used to calculate a quality measure.

16 Claims, 11 Drawing Sheets

(56) References Cited

U.S. PATENT DOCUMENTS

Figure 1:
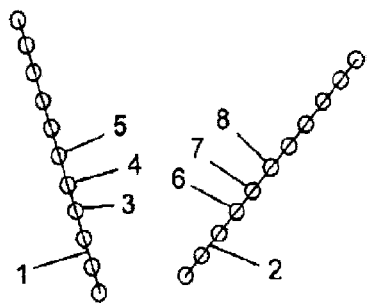

| | | | |
|---|---|---|---|
| 4,806,936 A * | 2/1989 | Williams et al. | 342/126 |
| 5,732,043 A * | 3/1998 | Nguyen et al. | 367/127 |
| 6,668,218 B1 * | 12/2003 | Bulow et al. | 701/21 |
| 6,757,219 B2 * | 6/2004 | Larosa et al. | 367/124 |
| 7,020,046 B1 * | 3/2006 | Baylog et al. | 367/124 |
| 2002/0097635 A1 | 7/2002 | LaRosa et al. | |
| 2009/0307055 A1 * | 12/2009 | Karty | 705/10 |

FOREIGN PATENT DOCUMENTS

| | | |
|---|---|---|
| DE | 10129726 | 6/2001 |
| EP | 1531339 | 5/2005 |
| EP | 1531339 A2 * | 5/2005 |
| WO | 20070113485 | 11/2007 |

* cited by examiner

METHOD AND APPARATUS FOR PASSIVE DETERMINATION OF TARGET PARAMETERS

CROSS-REFERENCE TO RELATED APPLICATIONS

This application is the National Stage filing under 35 U.S.C. 371 of International Application No. PCT/EP2009/057655, filed Jun. 19, 2009, and claims priority of German Patent Application No. 10 2008 030 053.5-55, filed Jun. 25, 2008, which is incorporated herein, in its entirety, by reference.

BACKGROUND OF THE INVENTION

The invention relates to a method for passive determination of target parameters by directionally selective reception of sound waves, of the type mentioned in the precharacterizing clause of claim 1, and to a corresponding apparatus of the type mentioned in the precharacterizing clause of claim 16.

In order to covertly determine target parameters, such as course, velocity and range of a target, for example of a surface vessel or of a submarine, from a carrier vehicle, for example from a surface vessel or a submarine, sound waves of target noise emitted from this target are conventionally received by means of a sonar receiving installation, and bearing angles to the target are measured. A position of the target is estimated from these measured bearing angles, together with the carrier vehicle's own position, and an estimated bearing angle associated with this estimated position is calculated. This is based on the assumption that the target is moving uniformly, that is to say on a constant course and at a constant velocity.

A non-recursive, iterative computation method for minimizing any difference between measured and estimated bearing angles over a plurality of processing cycles, or the square of this difference, is solved by a method for solving linear equations, subject to constraints, using the least square errors method, and this is described in chapter 23, pages 158 to 173, Linear Least Squares with linear inequality constraints, in the book "Solving least squares problems" by Charles R. Lawson, Richard J. Hansen, Classics, In Applied Mathematics, SIAM, ISBN-0-89871-356-0, 1995. In addition, the MATLAB optimization tool box contains a program LSQLIN.M and LIS.M, which numerically solve the algorithm stated in this book. The basic estimated position is identified as a target position by means of this computation method when an error limit is undershot, the target parameters of which target position then also provide the sought target parameters. These are optimized as a function of the iteration method used, on the basis of a predetermined optimization criterion. The resultant target parameters therefore belong to a solution which is optimized in accordance with this optimization criterion. This solution is updated with each new bearing angle measurement during each processing cycle of the basic data processing and, in general, is improved continuously. However, the solution may deteriorate, for example in the event of a target maneuver. In the same conditions, in particular without any target maneuver or change in the sound propagation conditions, the optimized solution will, however, always approach closer to the actual target parameters as the observation time increases.

Methods such as these are known, for example, from DE 34 46 658 C2, DE 101 29 726 A1 and EP 1 531 339 A2. Depending on the method used and the current scenario, the solution which is in each case determined to be the best solution, that is to say the optimized solution, converges sooner or later with the actually correct solution.

However, the known methods have the disadvantage that only one solution is ever calculated, and is output to the operator of the sonar receiving installation. The indicated solution is admittedly the respectively best solution in the sense of the respectively used optimization criterion. However, the operator does not know how good the solution actually is since it is impossible for him to view the computation process in order to determine the optimized solution.

Furthermore, the operator cannot tell how probable it is that the optimized solution is also the correct solution, that is to say how reliable the calculated and indicated solution actually is.

By way of example, scenarios can occur in which, at least in an early phase of target data determination, it is still quite uncertain whether a target is approaching or moving away. This leads to a target course which is moving away being calculated in one processing cycle, for example, while an approaching course is output as the best solution in the next processing cycle, when a further bearing measurement is available. The operator can therefore often not tell whether the best solution indicated to him is reliable.

WO2007/113485 A1 discloses a further method for passive determination of an unknown position of an object by means of a multiplicity of sensors, in which a value based on a relative position of the sensor and of the object is determined for the quality of the estimate of this position.

Nonetheless, the invention is based on the problem of being able to assess how reliable the supposedly best solution is, that is to say the solution optimized on the basis of a predetermined optimization criterion.

The invention solves this problem by a method as claimed in claim 1 and by an apparatus as claimed in claim 16.

During each processing cycle, in addition to the conventional method as described initially for determination of the solution optimized on the basis of a predetermined optimization criterion, for target range, target position, target course and target velocity, target tracks are calculated according to the invention for a large number of possible solutions for the target parameters to be determined. These target tracks are in each case defined by assumed target parameters for the target course and the target range, with respect to their direction and their start. Assumed target positions located on the target tracks are characterized by the assumed target velocity. The assumed target range is in this case a range between the measurement location of the sonar receiving installation and the assumed target position at the start, at the end or within the assumed target track. These target tracks start at a first bearing ray, which is associated with a first measured bearing angle, and end at a bearing ray which is associated with the most recently measured bearing angle. A quality measure is calculated for each possible solution for the target parameters along the target tracks from the bearing angles associated with the possible target positions and the measured bearing angles. The quality measure is the same for all the assumed target parameters associated with the same target track. Each target parameter results in a different distribution of the quality measure for the various possible solutions, since the quality measure is different for the individual target tracks, and therefore for the associated target parameters. These target-parameter-dependent distributions also contain a quality measure for the optimized solution, obtained from the optimization method, of the target range, of the target course and of the target velocity. The distribution of the quality measure of each target parameter provides a conclusion about the reliability of the optimized solution.

The distribution of the quality measure as a function of the range to the target has an envelope curve in the form of a bell curve. If the width of the bell curve at or above a predetermined minimum quality is below a predetermined limit value, then the range to the target associated with the optimized solution is assessed as being reliable.

If the envelope curve of the distribution of the quality measure as a function of the course does not have a single pronounced maximum (since, for example, this distribution consists of a plurality of bell curves alongside one another), further bearing angle measurements must be used to determine the optimized solution. The optimized solution is reliable only when the envelope curve of the distribution of the quality measure has a single maximum above the predetermined minimum quality, and has less than a predetermined width.

The profile of the envelope curve of the distribution of the quality measure over the possible target velocity is likewise checked in the area of the optimized solution for this target parameter. A reliable solution is probable when, in this case as well, the width of the distribution for a predetermined minimum quality is less than a predetermined limit value.

The advantage of the method according to the invention is that the distribution of the quality measure over the respective assumed target parameters provides a reliability indicator or a reliability degree, and therefore provides information as to whether the optimized solution is trustworthy.

For all the assumed target tracks, the assumed target positions, which are dependent on the assumed target velocity of each assumed target track, lie on an assumed bearing ray to the measurement location of the sonar receiving installation, which characterizes an associated bearing angle, a so-called assumed bearing angle. These assumed target positions are each also associated with a measured bearing angle, which belongs to a bearing ray of an actual measurement. This bearing ray either passes through the associated assumed target position or passes it at a greater or lesser distance depending on the quality of the estimate, that is to say it passes through an area around the assumed target position. The differences between measured and assumed bearing angles are calculated along each assumed target track for a quality measure which allows a statement to be made on how well the assumed target track corresponds to or approaches the actual target track. This results in a solution area with a multiplicity of possible solutions, which area also includes the optimized solution.

The relative positions of the target parameters found for the calculated possible solutions are analyzed with respect to one another for each target parameter, that is to say for example for the target course, target range or target velocity, in each case separately, and a reliability indicator is determined for each target parameter from these relative positions with respect to one another, in which case, however, the only solutions and associated target parameters which are considered are those whose quality measures have a minimum quality. This means that poor solutions are not used to determine the reliability indicator. A reliability degree is then derived from the reliability indicators of the respective target parameters. For example, the mean value of the three reliability indicators is formed, and is output as the reliability degree. Alternatively, the reliability indicators are compared with one another and, in the event of major discrepancies between them, the reliability degree is output as low. The reliability degree obtained in this way is, finally, associated with the optimized solution. This indicates how reliable the solution calculated to be the best solution is.

In one particular embodiment, the assumed target tracks are determined in the form of a network. A constant course and a constant velocity are assumed for each target track. The network is bounded by a first and a last bearing ray, in which case the first bearing ray is associated with a first measured and possibly artificially noisy bearing angle and with a most recently measured and possibly artificially noisy bearing angle. The first bearing ray and the last bearing ray are defined automatically or manually by operator action. In this case, each assumed target track starts on the first bearing ray at a start point, and ends on the last bearing ray at an end point, in which case the start points on the target tracks on the first bearing ray and the end points on the target tracks associated with the same start point on the last bearing ray are each arranged at different ranges from the sonar receiving installation. The fineness of the network is in this case advantageously governed by the distance between the assumed target start positions and end positions on the first and the last bearing rays. The more finely the network is covered, the more accurately the distribution of the quality measure can be calculated as a function of the assumed solutions. The first and/or the last bearing ray and/or the associated measured bearing angles can advantageously artificially be made noisy, thus making it possible to achieve better assumptions for the target track, statistically on average.

The quality measure of a target track is preferably calculated from the sum of the—advantageously weighted—squares of the differences for the bearing angles assumed along the target track and the associated measured bearing angle. The quality measure can then be indicated by means of the following formula:

$$Q(i, j) = \sum_{k=1}^{n} w_k \cdot [B_{meas,k} - B_{est(i,j),k}]^2$$

In this case, $Q(i, j)$ denotes the quality measure for an assumed target track $Z(i, j)$ with a start range $Rfirst(i)$ associated with the start point of the target track, and with a range to the end point of the target track $Rlast(j)$. The index $k$ runs from 1 to $n$, where $n$ indicates the number of measured bearing angles $B_{meas,k}$ or assumed bearing angles $B_{est,k}$ along the target track. $w_k$ denotes weighting factors which, for example, correspond to the inverse standard deviation, as determined during initial filtering, of the measured bearing angles $B_{meas,k}$. $B_{est(i,j),k}$ denotes the assumed bearing angle of the k-th bearing ray for the target track $Z(i, j)$.

In a further preferred embodiment, the quality measure is calculated from the inverted sum of the—advantageously weighted—squares of the differences between measured bearing angles and assumed bearing angles, and the sum is multiplied by the smallest of these sums of all the assumed target tracks. This means that, rather than using the values $Q(i, j)$ in accordance with the abovementioned formula, the inverse quality measures are used, normalized with respect to the interval between 0 and 1, that is to say [0, 1]. This means that $Q(i, j)$ is replaced by $Qinv(i,j)=min(Q)/Q(i, j)$.

In this case, the optimized solution with the highest reliability degree is located where the abovementioned sum $Q(i, j)$ is a minimum and the inverted sum, multiplied by the smallest of the sums of all the assumed target tracks, that is to say $Qinv(i, j)=1$.

A possible solution is preferably excluded from the assumed solutions and is not included in the solution area if the associated target track does not intersect all the bearing rays associated with the measure and/or assumed bearing angles. A solution such as this is improbable, and therefore does not need to be considered any further.

Furthermore, solutions are preferably excluded from the solution area if they are outside one or more predetermined constraints. By way of example, one such constraint may be a maximum target velocity. This is because it is often possible to assume that a watercraft cannot exceed a specific velocity, for technical reasons.

A further constraint may be a minimum target velocity. For example, this is because it can be assumed that a freighter does not travel at a velocity below one knot.

A further constraint may, for example, be a maximum or minimum target range which results, for example, from the maximum range of the sonar receiving installation used and the signal processing associated with it.

Furthermore, a maximum and/or a minimum orientation angle may be used as a constraint. In this case, the term orientation angle denotes the difference between the target course and target bearing. The orientation angle therefore indicates a movement angle relative to the sonar's own position, that is to say relative to the position of the observing sonar receiving installation, or a relative angle of a motion vector of the target. An orientation angle of 0° therefore means that a target is moving directly toward the sonar's own position. In contrast, an orientation angle of 180° means that a target is moving in the opposite direction, away from the sonar's own position.

In one particular embodiment, the reliability degree of the optimized solution is classified as "high" if all the respective target parameters of those solutions with a quality measure which indicates a minimum quality lie within a predetermined bandwidth. This bandwidth is advantageously provided around the mean value of the respective target parameter of these solutions.

This bandwidth is advantageously provided around the respective mean value of the respective target parameter of these solutions. If the target parameter of the optimized solution is within this bandwidth, this solution has a high reliability degree.

In a further embodiment, a reliability indicator is in each case determined from the possibly normalized sum of the, in particular squared, magnitudes of the differences between a target parameter associated with one of the solutions and the mean value of the target parameters relating to the solutions with a quality measure which indicates a minimum quality, for each target parameter type, that is to say for example for the target range, the target course and the target velocity. This reliability indicator is therefore based essentially on the standard deviation or variance of the target parameters of the associated target parameter type. The higher the standard deviation or variance is, the lower is the classification of the reliability of the optimized solution.

The difference mentioned above between measured and assumed bearing angles is advantageously weighted. The inverse quality measure or the square or some other power of the inverse quality measure can be used as a weighting factor. Therefore, solutions with a low inverse quality measure are provided with a lower weighting for determination of the reliability indicator. Conversely, solutions with a high quality measure are more highly weighted.

The reliability degree is advantageously determined from the poorest reliability indicator or, for example, from the mean value of the previously normalized reliability indicators of the various target parameter types.

In one particularly preferred embodiment, during each processing cycle, the target parameters of the solutions with a quality measure which indicates a minimum quality are displayed on a display apparatus, in particular visualized in graphical form, by means of one or more two-dimensional diagrams of the quality measure over the assumed target course, the assumed target range and/or the assumed target velocity. Such visualization allows accurate reading of the target parameters relating to a selected quality measure. In particular, the display of such two-dimensional diagrams for all the relevant target parameters allows visualization of the target parameters associated with one solution within these diagrams. In this case, by way of example, an operator chooses a specific value of a target parameter with a specific quality measure within one of the diagrams, and then by means of a special identification, is then provided with the other target parameters associated with the selected solution and with the same quality measure. For example, all the target parameters associated with a solution are then displayed in one specific color, which differs from the display color of the other target parameters. This allows the operator to see directly whether the solution is or is not probable. For example, the operator can see that a specific target course is possible only at a very low target velocity and is therefore highly improbable, despite possibly having a high quality measure (since, for example, certain vessel types travel at a minimum speed).

The entire solution area, that is to say all the solutions associated with assumed target tracks, possibly after exclusion of impossible or improbable solutions, is advantageously displayed on a display apparatus such that the respective quality measure of the multiplicity of solutions is actually visualized in graphical form for all the assumed target tracks, as a function of one or more target parameters. This means that the quality measure is in each case plotted against all the assumed target courses, target ranges and/or target velocities. This therefore results in graphs which show the associated quality measure for each assumed solution or each target track. The operator can therefore see at a glance whether the solution calculated as the optimized solution has a quality measure which is above the minimum quality in a broad range of a target parameter, or has a broad maximum with a small positive and negative gradient to the maximum value. In this case, the operator can assume that there are a large number of solutions with approximately the same quality, but which have significantly different values of the respective target parameter, and the optimized solution located in this area is not reliable.

Furthermore, the operator can also quickly see whether a plurality of narrow areas of possible solutions with a high quality measure exist. This is the case, for example, when it is still unclear, because of insufficient measurement data, whether a target is approaching or moving away. In this case, there are normally two areas with solutions with approximately the same quality measure for the target course. The operator can therefore quickly see on the basis of the quality measure visualized over all the solutions whether the optimized solution is probable, or whether solutions of similar quality lead to possibly very different target parameters.

The determination of a solution area, determined from a multiplicity of possible solutions, during each processing cycle and the visualization of this solution area during each processing cycle allow the operator to tell at a glance where potentially possible solutions may be located. The reliability of a solution can therefore be estimated quickly and easily.

The quality measure is preferably visualized on a separate display, thus allowing the operator to still observe the normal situation display, and it is possible to visualize the solution area for a target, in order to make it possible to estimate the reliability of the solution determined to be the best solution. In a further special embodiment, during each processing cycle, the target parameters of the solutions with a quality measure which indicates a minimum quality are displayed by means of one or more three-dimensional diagrams of the quality measure over a) the assumed target course and the assumed target range, b) the assumed target course and the assumed target velocity, c) the assumed target range and the assumed target velocity, and/or d) the assumed target range, the assumed target course and the assumed target velocity, in particular visualized graphically, on a display apparatus. The use of three-dimensional diagrams is advantageous in order to obtain a first rough overview of the quality measures associated with the solutions. The value of the quality measure is in this case advantageously displayed on a color-coded basis.

When using three-dimensional diagrams, the operator can advantageously vary the viewing angle of the respective diagram. This makes it possible to visualize more clearly structures in the solution area or in the profile of the quality measure.

In a further preferred embodiment, during each processing cycle, the target parameters of the solutions with a quality measure which indicates a minimum quality are visualized, in particular in graphical form, by means of at least four two-dimensional diagrams of the quality measure, and are displayed on a display apparatus, with the quality measure in each case being plotted over two target parameters. In this case, the value of the quality measure is preferably color-coded and/or coded by the size of symbols. These four diagrams are advantageously arranged in two rows and two columns, such that two guidelines are in each case located laterally alongside one another. In this case, for each of three target parameters, in a first diagram, the respective target parameter is plotted on a first axis, that is to say either on the vertical axis or the horizontal axis of the diagram, against a first of the two other target parameters, and, in a second diagram, which is laterally adjacent to the first diagram, the same target parameter is plotted on the same axis against the second of the two other target parameters, with the two other target parameters each being plotted on a different axis, at right angles to the first axis. This type of visualization allows the operator to quickly tell which target parameters are associated with one another. This makes it easier for the operator to estimate how probable a solution is.

In a further preferred embodiment, when a solution is chosen automatically or manually, the associated assumed or estimated target parameters are marked on the diagram or diagrams. The operator can therefore tell at a glance which of the target parameters are associated with a common solution.

In a further advantageous embodiment, when a solution is chosen, a diagram, associated with said solution, of the bearing angle differences between the respectively measured and the respectively associated assumed or estimated bearing angles is displayed on a display apparatus. This display provides the operator with further information about the quality and probability of a solution. For example, he can therefore identify spurious bearings, and can exclude these from the further calculation.

In a further advantageous embodiment, the visualized quality measure is colored such that the quality measure is subdivided into a plurality of predetermined value ranges, and a different color tone is associated with each value range. In this case, a quality measure with a value within one of these value ranges is displayed with the associated color tone. Potential solution regions can therefore be made clearly visible to the operator for different target parameters. This means that the operator can use the coloring to quickly distinguish between solution regions with a high, medium or low probability.

In a further preferred embodiment, an expected region for which the quality measure reaches a minimum quality is calculated for each target parameter. An expected region such as this is advantageously identified in the corresponding diagram. This can be done, for example, by coloring or marking the expected region. The operator in this way very quickly identifies regions of possible high-quality solutions.

In a further preferred embodiment, sound waves are received by means of a plurality of arrangements of waterborne sound sensors, in particular a plurality of different sensors or antennas, such as a towed-array antenna or an antenna arranged on the vessel itself, for example a flank antenna or a cylindrical base, in order in this way to measure bearing angles to a target from different measurement locations. This results in a plurality of bearing angles to a target, and a target position can be estimated roughly in the form of a cross-bearing by means of these different bearing angles from different measurement locations. This estimate can be used to restrict a possible solution area for the possible solutions of the target parameters to be determined. This solution area can therefore advantageously be reduced. Furthermore, the optimized solution also has a higher reliability degree.

In a further advantageous embodiment the frequencies of the sound waves which are emitted by a target and/or the sound waves which are incident from a measured bearing angle are measured, and these measured frequencies are used to estimate the target position. The use of the additional frequency measurements likewise makes it possible to restrict the solution area for the possible solutions of the target parameters to be determined. This advantageously also results in the optimized solution having a higher reliability degree.

Figure 2:
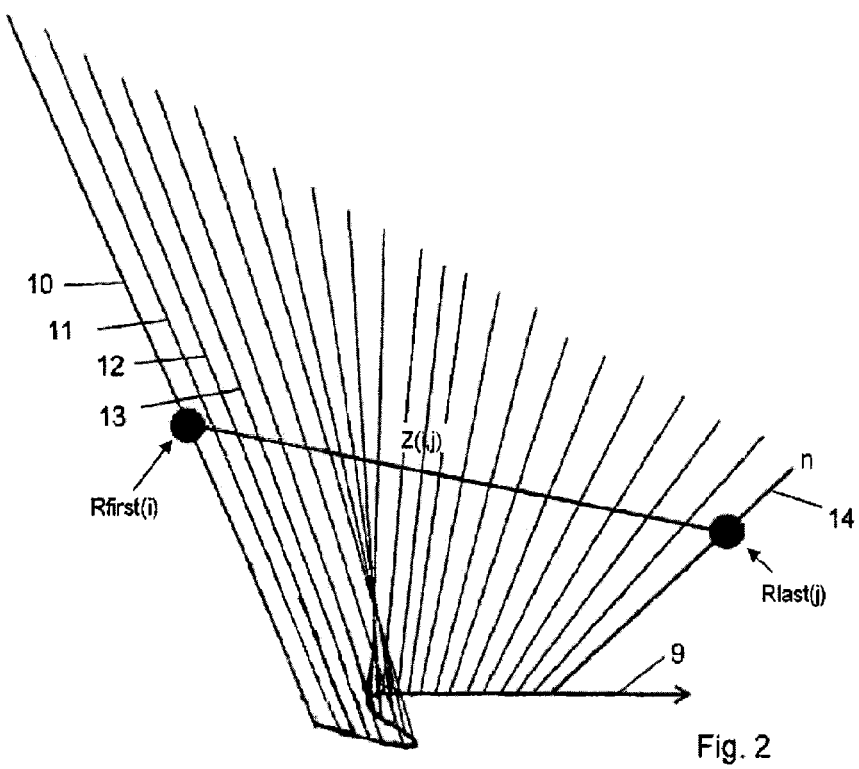
Figure 3:
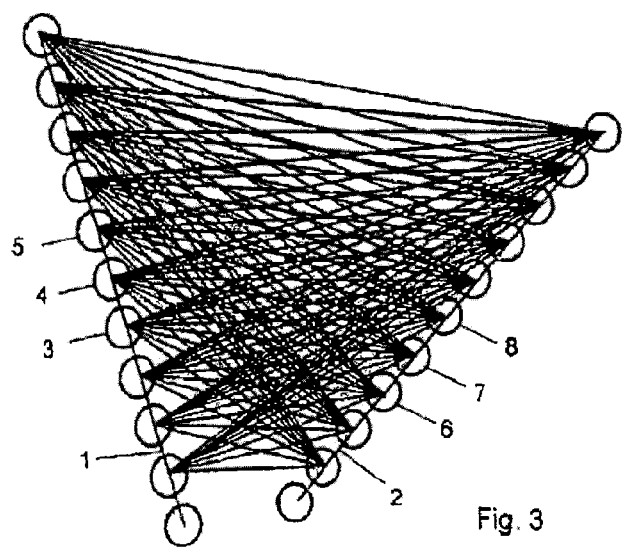
Figure 4:
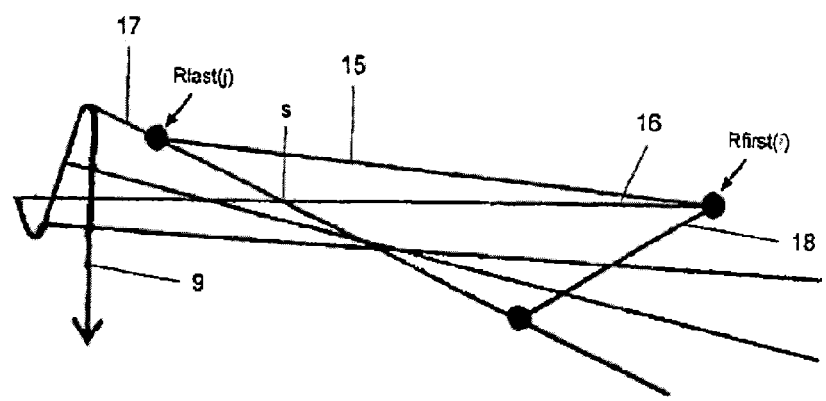
Figure 5:
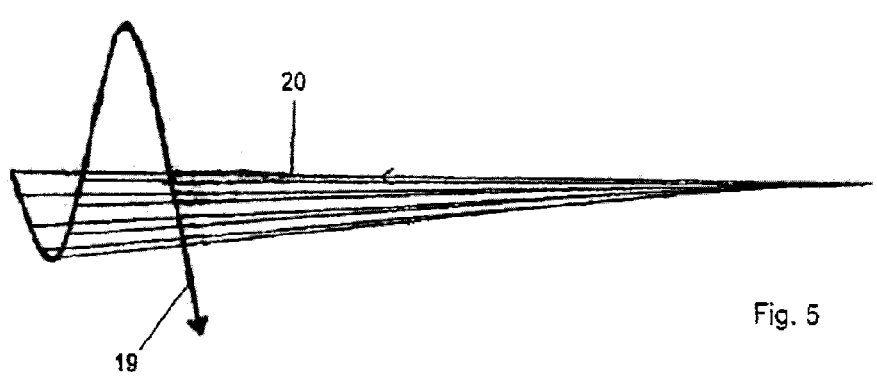
Figure 6:
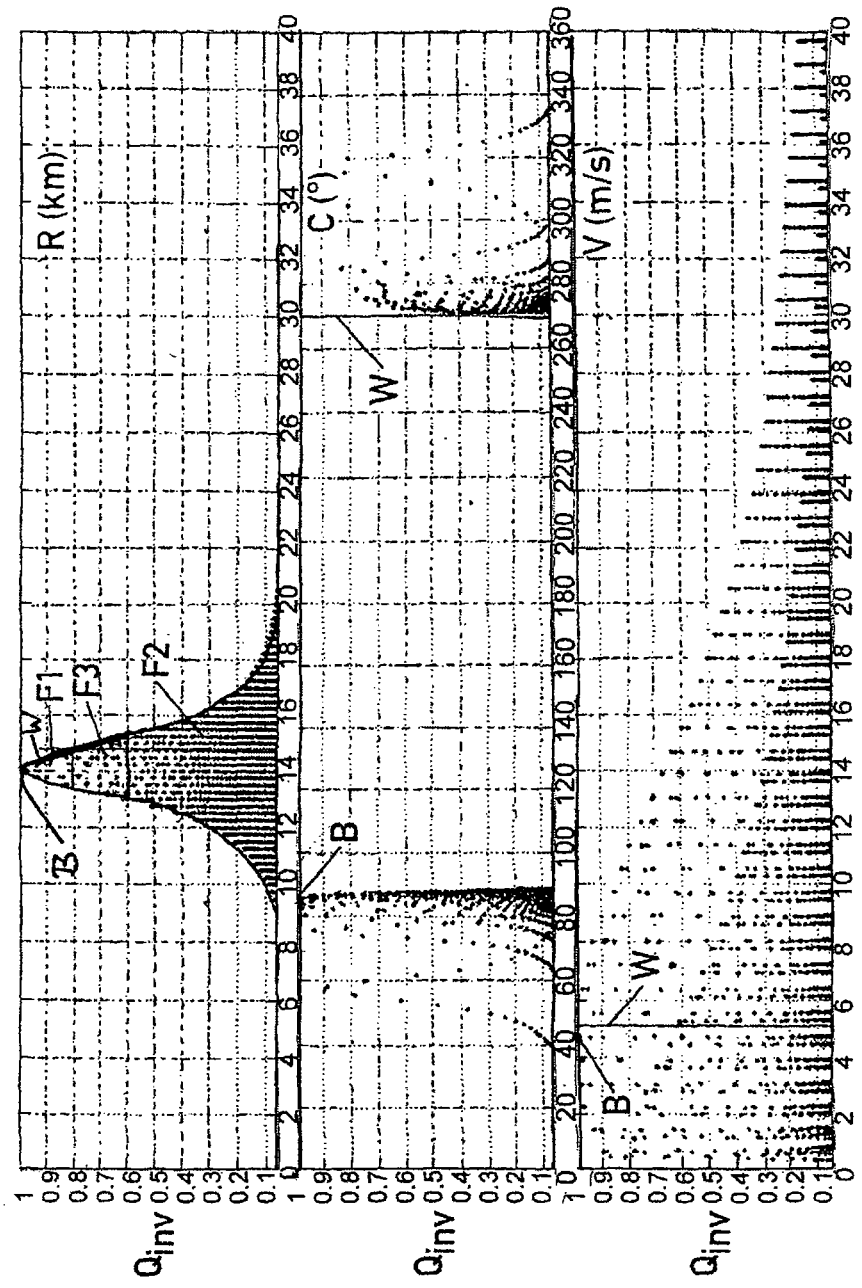
Figure 7:
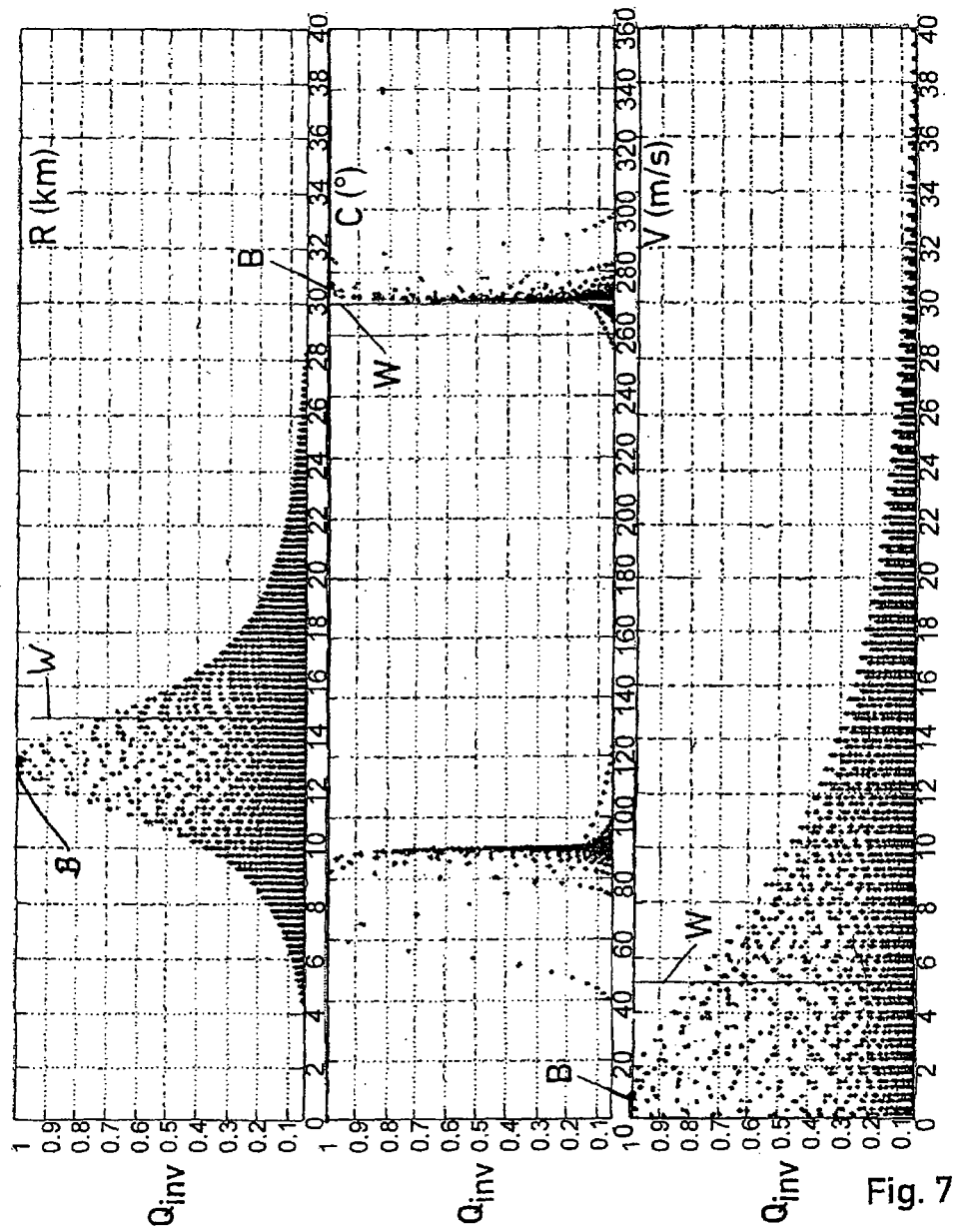
Figure 8:
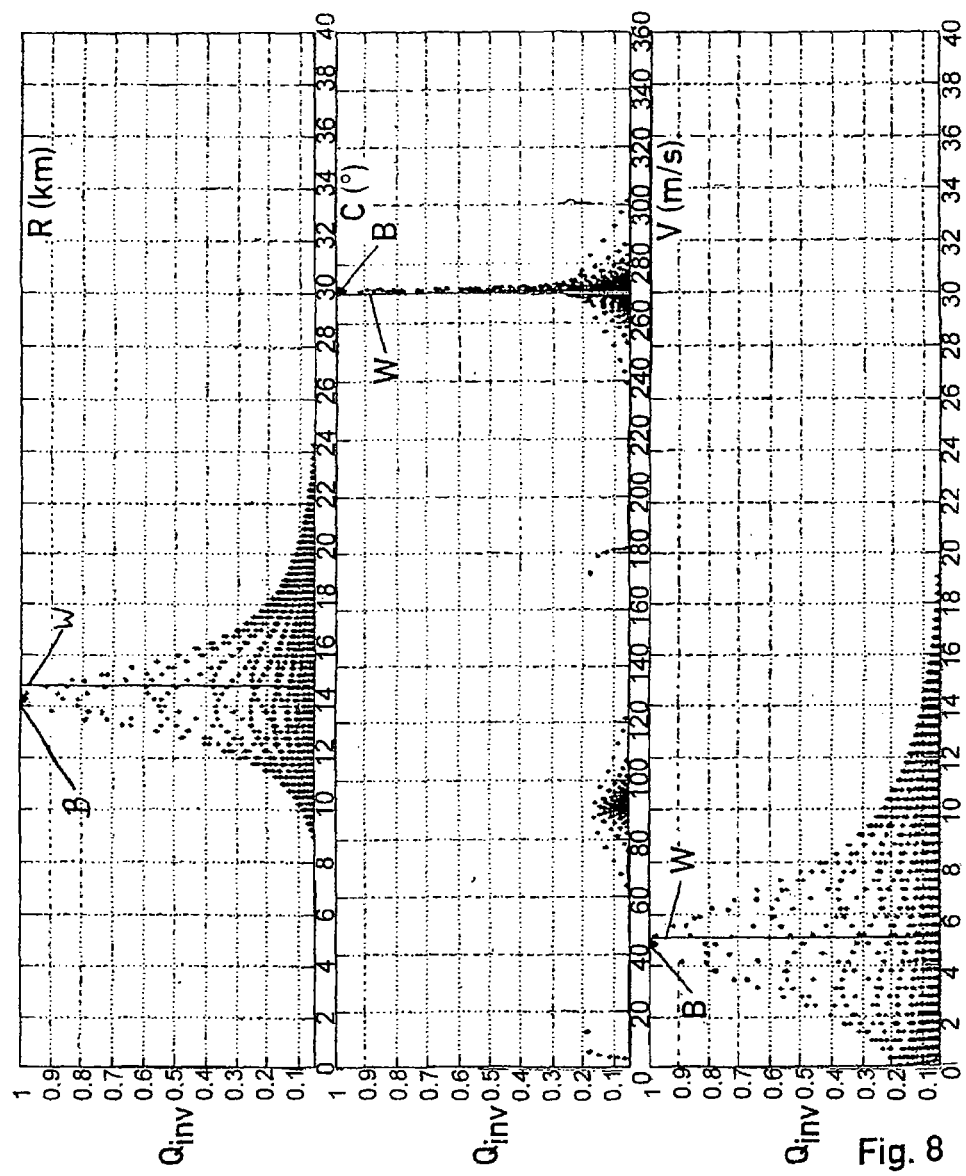
Figure 9:
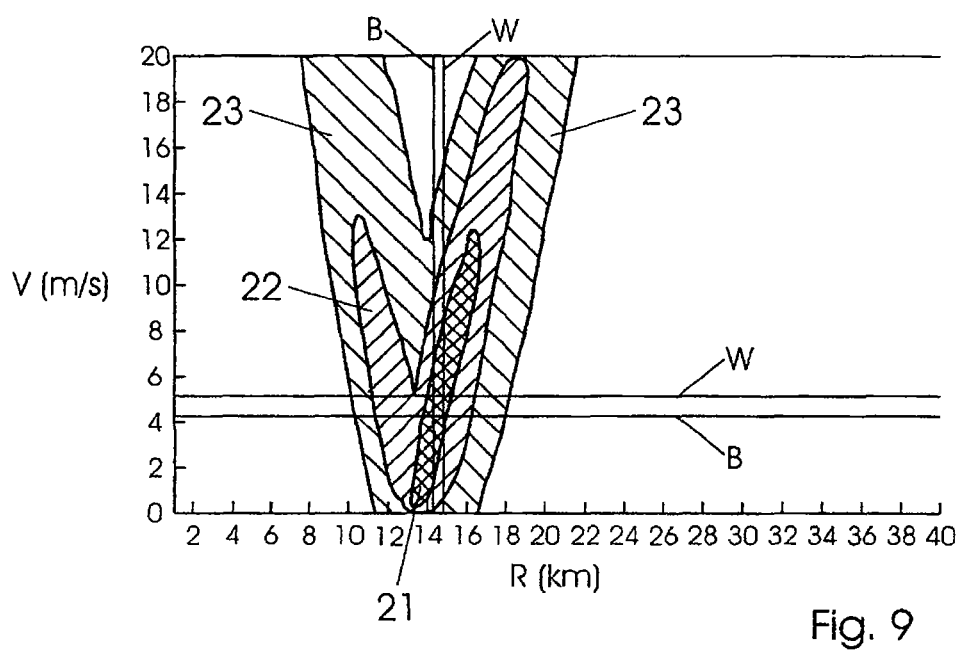
Figure 10:
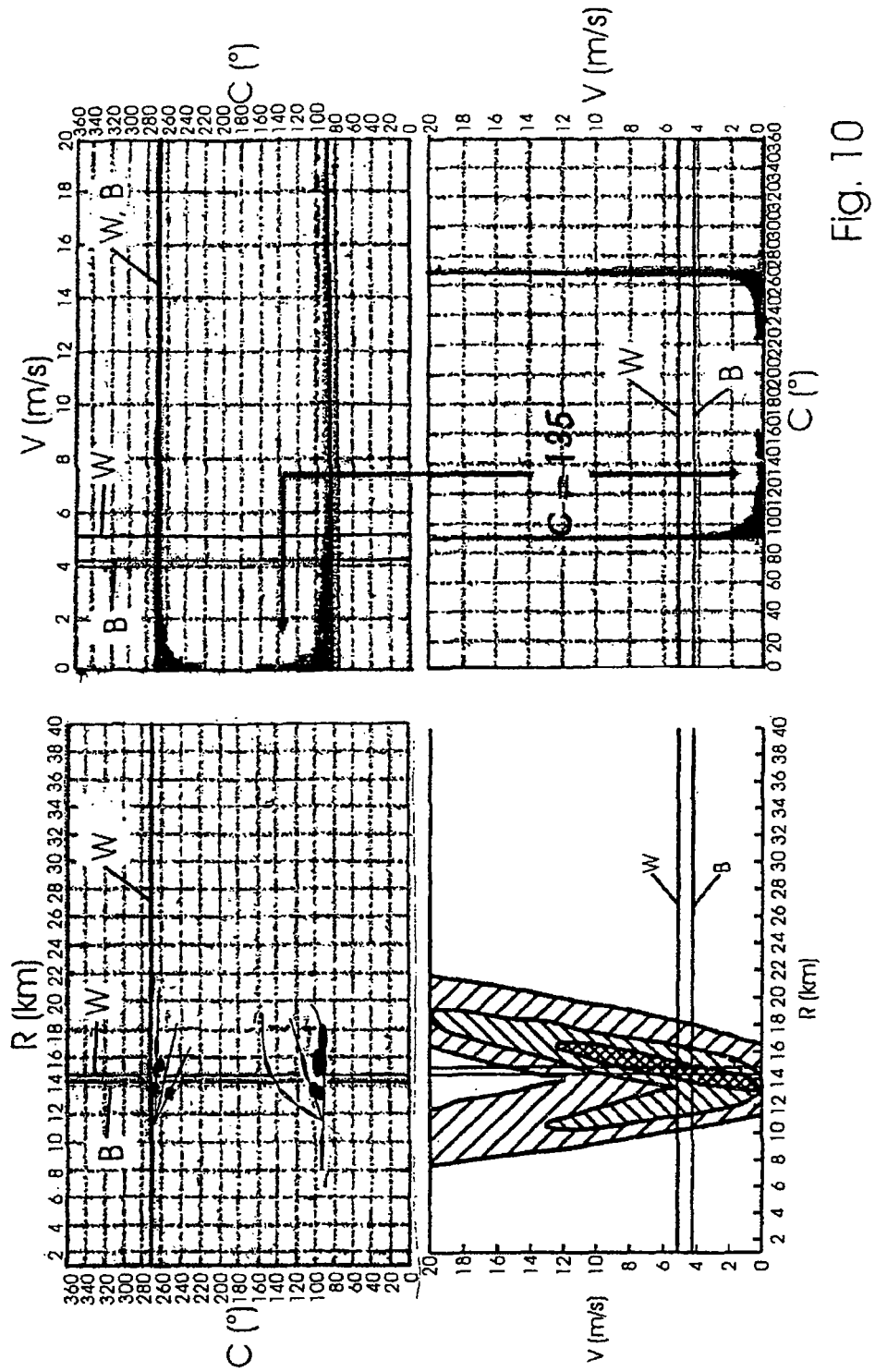
Figure 11:
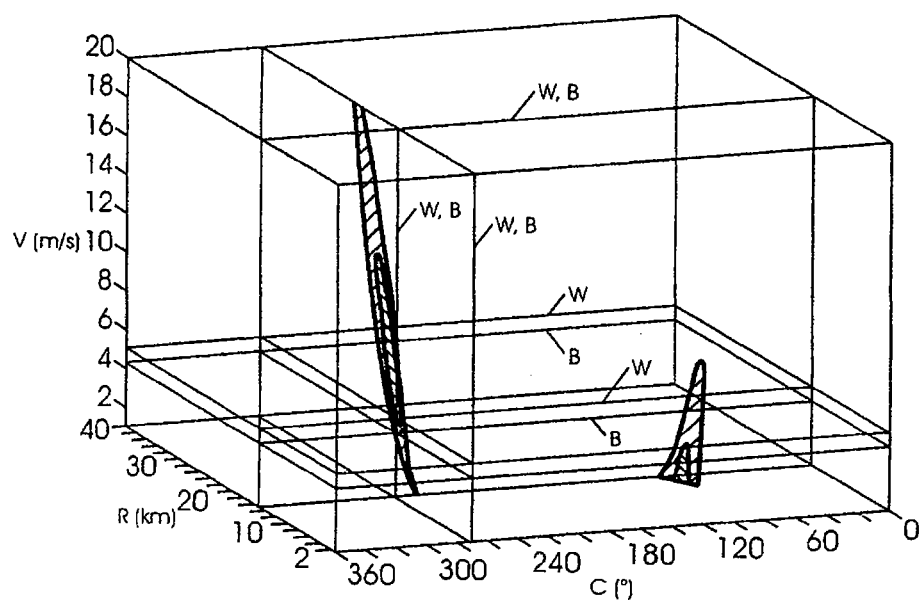
Figure 12:
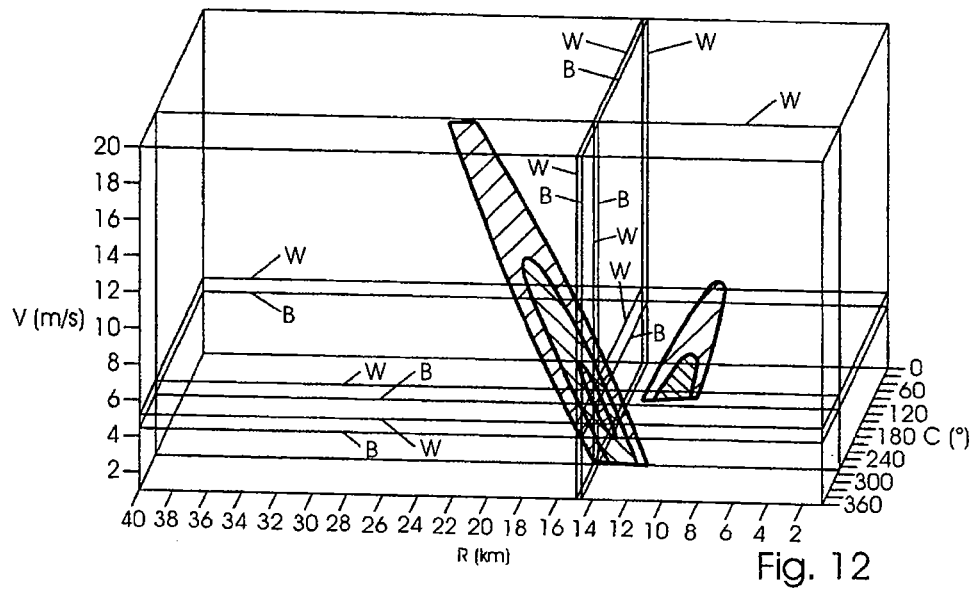
Figure 13:
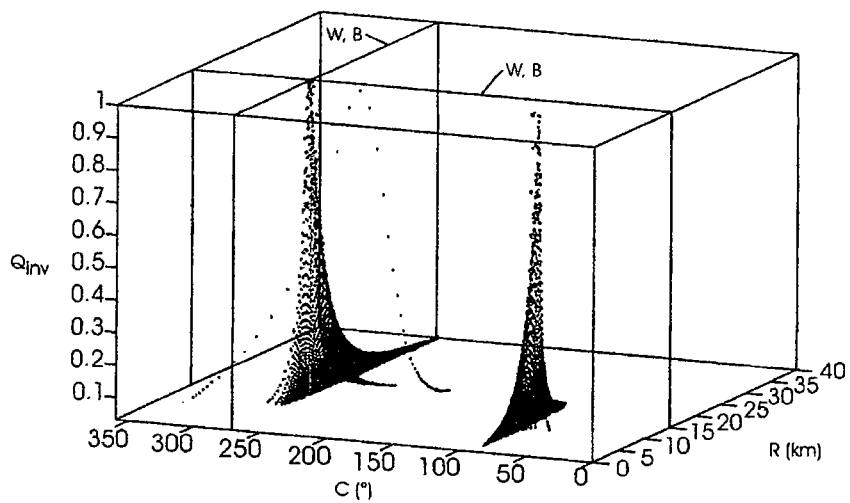
Figure 14:
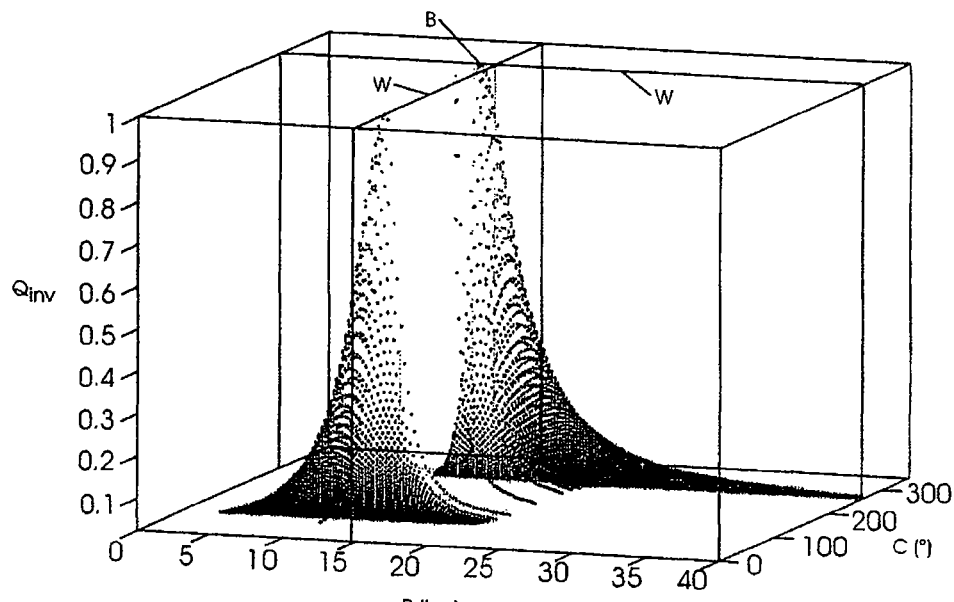
Figure 15:
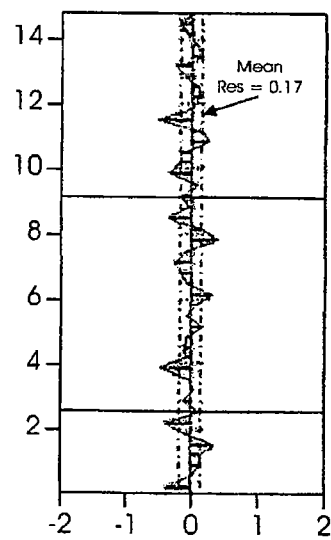
Figure 16:
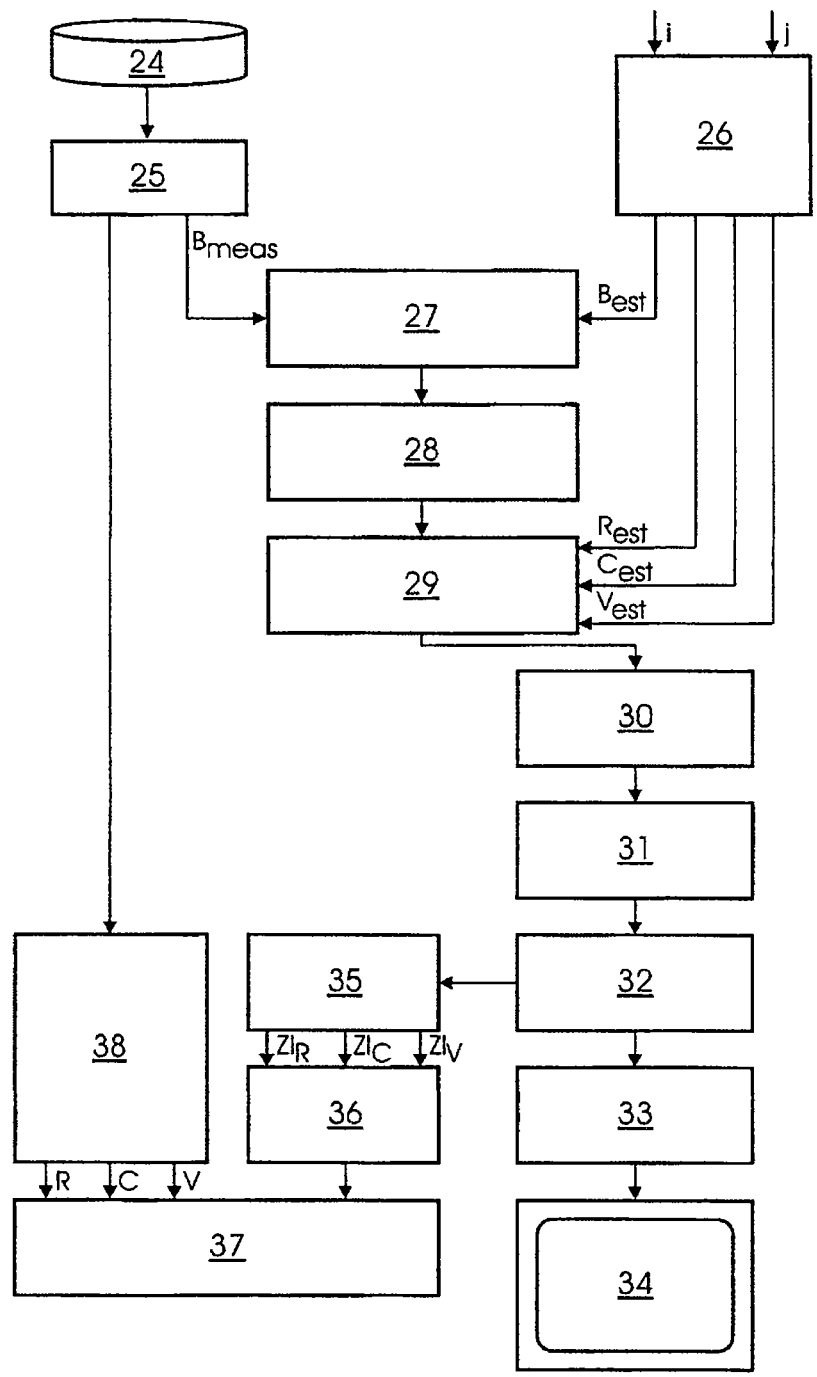

Further preferred embodiments result from the dependent claims and from the exemplary embodiments, which will be explained in more detail with reference to the attached drawing, according to the invention. In the drawing:

FIG. 1 shows two bearing rays in a view from above,

FIG. 2 shows a scenario with a multiplicity of bearing rays from a carrier vehicle to a target, in a view from above, FIG. 3 shows a network of target tracks, which run from a first bearing ray to a last bearing ray, in a view from above, FIG. 4 shows a scenario in a view from above in order to explain impossible target tracks, FIG. 5 shows a further scenario in a view from above with bearing rays from a carrier vehicle to a target, FIG. 6 shows three two-dimensional diagrams in order to illustrate the quality measure over three target parameters, specifically the target range, the target course and the target velocity, for the scenario shown in FIG. 5 at a first processing time, FIG. 7 shows the diagrams from FIG. 6 at a second, later processing time, FIG. 8 shows the diagrams from FIG. 6 at a third, even later, processing time, FIG. 9 shows a further diagram in order to illustrate the quality measure, over the target velocity and the target range, FIG. 10 shows four two-dimensional diagrams in order to illustrate the quality measure, in each case over two target parameters, FIG. 11 shows a three-dimensional diagram in order to illustrate the quality measure over three target parameters, specifically the target course, target range and target velocity, FIG. 12 shows the diagram from FIG. 11 from a different viewing angle, FIG. 13 shows a three-dimensional diagram of the quality measure over the assumed target course and the assumed target range, FIG. 14 shows a three-dimensional diagram of the quality measure over the assumed target range and the assumed target course, FIG. 15 shows a diagram to illustrate bearing angle differences along a target track of a selected solution, and FIG. 16 shows a block diagram to illustrate a method and an apparatus for visualization of target parameters according to one exemplary embodiment of the invention.

A plurality of arrangements of waterborne sound sensors, in particular electroacoustic transducers, are located on board a watercraft, in particular a submarine. A first such transducer arrangement is, for example, arranged as a cylindrical base in the bow of the watercraft. A second arrangement of waterborne sound sensors is arranged, for example, as a so-called linear antenna on one side, for example the starboard side, of the watercraft. An arrangement of the same type is located on the opposite side, that is to say the port side. A further arrangement of waterborne sound sensors can be towed behind the watercraft, as a towed-array antenna.

Signals received by these arrangements are combined in a sonar receiving installation to form array signals of adjacent directional characteristics in a beamformer and receive sound on a directionally selective basis, corresponding to the main reception directions of the directional characteristics. In the case of a cylindrical base, the main reception directions are aligned at right angles to the respective chords, which are offset by one transducer in each case, of a circular arc of the cylindrical base filled with transducers, in that the signals received by the waterborne sound sensors are phase-shifted or delayed in time corresponding to their distance from the circular arc, and are added to form array signals.

The signals received by a flank antenna are processed in a similar manner. For this purpose, these are likewise delayed in a beamformer corresponding to the various virtual scan angles of the flank antenna, and are added to form array signals, thus forming a fan of directional characteristics whose adjacent main reception directions cover a sector at the side of the watercraft.

Signals from a towed-array antenna are processed in a corresponding manner.

Bearing angles are associated with the array signals, as a function of the respective time delays. Intensity values, in particular levels, of the array signals are determined, associated with the bearing angle. An intensity profile which results from the determined intensity values, in particular levels, in particular a level profile, is then created over the bearing angle, and local maxima are determined in the intensity profile, in particular local level maxima in the level profile. Finally, the bearing angles associated with the local maxima are determined, and are associated with targets. This results in the measured bearing angles to targets, as mentioned initially.

A sonar receiving installation such as this furthermore has an estimation filter for determination of target parameters from measured bearing angles to a target. The bearing angles are preferably measured along a so-called own leg to the target with the watercraft traveling at a constant velocity, while the target is moving at a constant velocity on a target course from a first target position to a second target position.

FIG. 1 shows two bearing rays, for which the bearing of a target has been found at two different times. A first bearing ray 1 is associated with an initial bearing, while a further bearing ray 2 is associated with a final bearing at a later time. First of all, it is assumed that the target range is unknown. The target may therefore have been located at various positions 3, 4, 5 on the bearing ray 1, and likewise at various positions 6, 7, 8 on the bearing ray 2. A corresponding target range is associated with each position. However, since these target ranges are initially unknown, the target may have moved, for example, from the position 3 to the position 6, 7 or 8. The target may likewise have moved from the position 4 to the position 6, 7 or 8. However, in the same way, the target could also have moved from the position 5 to the position 6, 7 or 8.

The following procedure is now used to determine the target parameters:

N positions 3, 4, 5 are chosen on the first bearing ray 1, and M positions 6, 7, 8 are chosen on the last bearing ray 2.

A target track is then chosen which links one of the positions 3, 4, 5 on the first bearing ray 1 to one of the positions 6, 7, 8 on the last bearing ray 2. This target track is denoted Z(i,j) where the index i denotes the position i on the first bearing ray 1, and the index j denotes the position on the last bearing ray 2.

FIG. 2 shows the situation in which a watercraft (own vessel) with an observing sonar receiving installation is traveling along a movement path 9 and n bearings are recorded to a target which is moving from a first bearing ray 10 via bearing rays 11, 12, 13 etc. to the n-th bearing ray 14 along the target track Z(i,j). In this case, the course and the velocity of the target are constant.

However, the target range changes. The target range on the first bearing ray 10 for the target track Z(i,j) is Rfirst(i). The target range on the last bearing ray 14 is Rlast(j).

However, the target track Z(i,j) is only an assumed target track, and therefore need not correspond to the actual target track.

The initial target range, the target course and C(i,j) and the target velocity V(i,j) are calculated for each possible target track Z(i,j). However, instead of the initial target range, it is also possible to choose the target range Rlast(j) on the last bearing ray 14, or a target range within the assumed target track Z(i,j).

Furthermore, for each target track, a quality measure Q(i,j) is calculated from n residues, that is to say the angle differences between a measured bearing angle and a corresponding assumed bearing angle, to be precise preferably using the following formula:

$$Q(i, j) = \sum_{k=1}^{n} w_k \cdot [B_{meas,k} - B_{est(i,j),k}]^2$$

In this case, Q(i,j) denotes the quality measure for an assumed target track Z(i,j) with an initial range Rfirst(i) associated with the start point of the target track, and with a range to the end point of the target track Rlast(j). The index k in this case runs from 1 to n, where n indicates the number of bearing angles along the target track. $w_k$ denotes weighting factors, in order in the end to weight the measured bearing angles $B_{meas,k}$ corresponding to their accuracy or deviation from a mean value. By way of example, the inverse standard deviation of the measured bearing angles $B_{meas,k}$, determined during initial filtering, is used as a weighting factor $w_k$. $B_{est(i,j),k}$ denotes the assumed bearing angle of the k-th bearing ray for the target track Z(i,j), which corresponds with a measured bearing angle $B_{meas,k}$.

The quality measure therefore includes the differences between the measured bearing angles $B_{meas,k}$ and the assumed bearing angles $B_{est(i,j),k}$ associated with the target track Z(i,j) which are squared and added, multiplied by a weighting factor $w_k$.

In addition to the abovementioned sum, further data can be included in the quality measure. In particular, an additional summand can be included in the quality measure, which is indicated as follows:

$$\sum_{k=1}^{n} w_k \cdot [f_{meas,k} - f_{est(i,j),k}]^2$$

In this case, $f_{meas,k}$ denotes the measured (Doppler-shifted) frequency of the target noise, and $f_{est(i,j),k}$ denotes the assumed frequency of the target noise of the k-th bearing ray for the target track Z(i,j).

The assumed received frequency of the target noise $f_{est(I,j),k}$ is in this case calculated as follows:

$$F_{est(i,j),k} = f_{s_{est}} \cdot (c + VE_{rad,k})/(c + V_{rad(i,j),k})$$

where $VE_{rad,k}$ is the radial component of the vessel's own velocity at the time k, calculated from the vessel's own velocity, the vessel's own course and the measured bearing at the time k;

$V_{rad(i,j),k}$ is the radial component of the target velocity at the time k, calculated from the assumed target velocity V(i,j), the assumed target course C(i,j) and the assumed target bearing $B_{est(i,j),k}$ at the time k;

$fs_{est}$ is the estimated transmission frequency of the noise emitted from the target, which is calculated as the mean value of the n individual estimated values $fs_{est,k}$ $$FS_{est,k} = f_{meas,k} \cdot (c + V_{rad(i,j),k})/(c + VE_{rad,k}); k = 1, \ldots, n$$

and c is the speed of sound in water.

An algorithm for determining target parameters, for example according to DE 101 29 726 A1 or EP 1 531 339 A2, inherently uses a quality measure such as this as an optimization criterion. The algorithm chooses as the best solution that target track which results in an at least local or global maximum of the quality measure Q(i,j)—but conventionally without calculating a quality measure such as this individually, and outputting it to the operator.

However, according to the invention, a quality measure is calculated for each target track Z(i,j) which indicates the quality with which the target track Z(i,j) is considered as a possible solution for the sought target track.

The calculation of target parameters as mentioned above, specifically target range, target velocity and target course, as well as the calculation of the associated quality measure are carried out for all possible target tracks Z(i,j), but at least for a multiplicity of target tracks Z(i,j).

FIG. 3 schematically shows all the possible target tracks Z(i,j) for the situation as illustrated in FIG. 1.

All the possible target courses C(i,j) and all the possible target velocities V(i,j), with the associated quality measures Q(i,j), are therefore obtained for all the assumed initial target ranges R0(i)=Rfirst(i) and all the assumed final target ranges Rn(j)=Rlast(j).

If a number N of possible start positions are chosen on the first bearing ray 1 and a number M of possible end positions are chosen on the last bearing ray 2, this results in N×M possible target tracks and in consequence N×M possible solutions, which define a solution area. The spatial resolution of the solution area is governed by the distance between the possible start positions and possible end positions.

In a next step, target tracks which are associated with impossible solutions are eliminated.

FIG. 4 illustrates an impossible solution which is associated with an assumed target track 15. If S denotes the intersection of the first bearing ray 16 with the last considered bearing ray 17 (in each case starting from the movement path 9 of the own vessel), then the only target tracks which are considered are those which link positions to the right of the intersection S on the bearing ray 16 with positions to the right of the intersection S on the bearing ray 17. One such possible solution is illustrated as the target track 18.

Furthermore, it is possible to exclude those target tracks whose associated target velocities are greater than a maximum predeterminable velocity, because target tracks such as these are likewise impossible or improbable. Furthermore, target tracks can be excluded whose associated target velocity is very slow when, for example, a velocity can be deduced on the basis of a specific propeller noise.

The solution area can thus be reduced by exclusion of impossible or else improbable target tracks. A large number of possible target tracks nevertheless remain, depending on the choice of the start and end positions.

Furthermore, it is possible to exclude solutions which satisfy specific constraints. For example, solutions can be excluded whose range exceeds a maximum value since, for example, the range of the arrangement of waterborne sound sensors which is used, or the sensor range, is limited. A corresponding situation applies to a minimum range. The orientation angle can also be used as a constraint. If one wishes to permit only approaching targets, then solutions with orientation angles of less than −90° and with orientation angles of greater than +90° can be excluded.

Furthermore, solutions can be excluded which would lead over land or would collide with other maritime obstructions, such as shallows, for example sandbanks.

All the solutions found within the remaining solution area are then visualized in a further step. In this case, rather than using the value of Q(i,j) mentioned above as the quality measure, it is advantageous to use the inverse value of Q(i,j), normalized to the range between 0 and 1, that is to say to the interval [0, 1]. This means that Q(i,j) is replaced by Qinv(i,j)= min(Q)/Q(i,j).

The computationally best solution therefore results for the target track for which Q is a minimum, or Qinv(i,j)=1.

The quality measure can be visualized in various ways, which will be explained in the following text with reference to the scenario illustrated in FIG. 5, in which the own vessel is moving along a movement path 19, and the target is moving along a target track 20. The initial bearing at the time 0 is 90° with respect to north, that is to say the target is located to the east of the own vessel. The initial range is R0=15 km. In the assumed example, the target velocity is 5.1 m/s, and the target course is 270°, that is to say the target is moving on a westerly course. The initial orientation angle, that is to say the orientation angle at the time 0, is 0°.

FIG. 6 shows three diagrams in which the quality measure Qinv, normalized with respect to [0, 1], is plotted against the target range R at the start of the track—in which case, instead of using this target range at the start of the track, referred to as the "target start range", it is also possible to use the respective current target range—(top), the target course C (in the center) and the target velocity V (at the bottom). For particularly probable solutions, it can be stated that the quality measure Qinv is greater than 0.8. Subject to this precondition, it can be stated that the target start range R is between 13.5 km and 14.5 km. The best solution symbolized by B in FIGS. 6 to 14, with a quality measure Qinv of 1, is located at R=14 km. Since the expected region for the target range R is relatively narrow for this minimum quality measure, that is to say it is between 13.5 and 14.5 km, it can be assumed that the best solution is fairly probable, that is to say the true solution symbolized by W in FIGS. 6 to 14 corresponds to, or comes quite close to, the true or actual target parameters.

The middle diagram shows the quality measure Qinv over the target course C. As can be seen, there are a plurality of possible solution regions, to be precise on the one hand for solutions with a target course moving away from about 75° to 90° and in the region of about 55°, as well as for solutions with an approaching target course of about 285° and 315° to 320°. The best solution occurs at about 90°, which results in a quality measure Qinv of 1. However, this is a false course since the correct course is 270°, as shown in FIG. 5. This diagram of the quality measure Qinv over the target course C indicates to the operator at first glance, however, that, because of the wide scatter of possible regions for the target course C, there is a high degree of uncertainty with respect to the best solution. The operator therefore sees that he cannot necessarily trust the best solution despite the high quality measure Qinv of 1, since other solutions are also quite probable.

A corresponding situation applies to the target velocity V, which is illustrated in the lower diagram in FIG. 6. Target velocities V with a quality measure Qinv of at least 0.8 are located in a very wide range from about 0.5 to 10.5 m/s. The operator sees that the best solution, which is indicated for the quality measure Qinv of 1 as 4.7 m/s, is not very reliable.

This representation of the quality measure allows the operator to make the following interpretation: the target range is quite probably in a range between 13.5 and 14.5 km. The target course, like the target velocity, still cannot, however, be determined accurately, and requires further measurement data for more accurate definition.

This type of visualization of the quality measure Qinv, as shown in FIG. 6, can be improved further by coloring the displayed symbols for the quality measure Qinv. For example, symbols for values of the quality measure Qinv above an upper value can be displayed in a first color F1, symbols for values of the quality measure Qinv below a second value can be displayed in a second color F2, and symbols for values of the quality measure Qinv in an intermediate value range can be displayed in a third color F3. However, the number of value ranges is not restricted to three, but can also assume greater or lesser values. In this case, one color is preferably associated with each value range.

Alternatively, however, a color profile can also be used as a function of the respective value of the quality measure, in which case, for example, high values for the quality measure are displayed using red tones, and low values using blue tones. Furthermore, the visualization can be further improved by not displaying solutions with a quality measure below a limit value at all.

FIG. 7 shows diagrams which correspond to FIG. 6, but at a later processing time. As can now be seen from the middle diagram, the best solution with a quality measure Qinv of 1 is now around 275°. However, the best solution for the target velocity V in the lower diagram is now about 1 m/s, although the region for good solutions for the target velocity V has become narrower. However, from these diagrams, the operator will see that the target course C can still be determined only relatively uncertainly, and likewise the target velocity V.

FIG. 8 shows the diagrams corresponding to FIGS. 6 and 7, but at an even later processing time. The operator can now see that the target course C at 270° is highly probable, and that the target velocity V of 4.8 m/s is quite probable. The target start range R for the best solution is now 14.5 km. The regions for good solutions are now quite narrow for all parameters, indicating to the operator that the best solution is quite reliable.

FIG. 9 illustrates a further option of two-dimensional visualization of the quality measure Qinv, to be precise both over the target velocity V and over the target start range R. The value of the quality measure Qinv can be read on the basis of a color coding. However, for the sake of simplicity, color areas are represented schematically just by shading. The area 21 which is shaded in two directions symbolizes a region with a high quality measure, for example greater than 0.8. The areas 22 symbolize a region with a quality measure of a lower degree, for example between 0.6 and 0.8, while the areas 23 indicate a region with a low quality measure, for example less than 0.6.

FIG. 10 shows an illustration of the solution area with four two-dimensional diagrams, in which each individual diagram is created analogously to FIG. 9. In this illustration, the quality measure Qinv is once again in each case shown over two target parameters. The quality measure Qinv is shown over the target range R and the target course C in the diagram at the top on the left. The quality measure Qinv over the target range R and the target velocity V is illustrated in the diagram at the bottom on the left. The quality measure Qinv over the target velocity V and the target course C is illustrated in the diagram at the bottom on the right, while the target range R over the target course C and the target velocity V is illustrated the other way round in the diagram at the top on the right.

The chosen arrangement makes it possible to determine the dependency of one parameter on the two others very quickly:

The two diagrams on the left use the same x axis R, and show the dependency of the range R on the velocity V and the course C.

The two lower diagrams use the same y axis V and show the dependency of the velocity V on the range R and the course C.

The two upper diagrams use the same y axis C, and show the dependency of the course C on the range R and the velocity V.

FIG. 11 shows a more complex representation of the solution area, in which the quality measure Qinv is illustrated over the target range R, the target course C and the target velocity V in a three-dimensional diagram. The value of the quality measure is in this case coded in a manner corresponding to that in FIG. 9, that is to say for example in the form of coloring of the areas to be displayed, which are reflected here only on the basis of contours, for representation reasons.

FIG. 12 illustrates the situation shown in FIG. 11, but with the three-dimensional representation being viewed from a different angle. Solution regions can be made more visible by changing the viewing angle.

A further three-dimensional representation of the solution area can be produced by three-dimensional diagrams in which the quality measure Qinv is illustrated along a first axis, and two target parameters are illustrated along two further axes. FIG. 13 shows one such diagram, where the quality measure Qinv is plotted against the target course C and the target range R.

FIG. 14 illustrates the situation shown in FIG. 13, but viewed from a different angle.

For one chosen solution, FIG. 15 illustrates an associated diagram of the bearing angle differences between the measured and the respective corresponding assumed bearing angles. The greater the discrepancies around the vertical zero line are, the poorer is the quality measure of the associated solution.

FIG. 16 illustrates an apparatus according to the invention for carrying out a method according to the invention. Sound waves are received from a target by means of an arrangement 24 of waterborne sound sensors in the form of a cylindrical base, and their received signals are processed in a beamformer 25, thus allowing measured bearing angles $B_{meas}$ to a target to be determined.

Furthermore, a computation unit 26 is provided, in order to determine an assumed bearing angle $B_{est}$ from an assumed position of the target along an assumed target track Z(i,j). This computation unit 26 provides, in particular, an assumed bearing angle $B_{est}$ as well as assumed target parameters, which are associated with the corresponding target track Z(i,j), for the target range $R_{est}$ for the target course $C_{est}$ and for the target velocity $V_{est}$.

The measured bearing angle $B_{meas}$ and the assumed bearing angle $B_{est}$ are supplied to a subtraction unit 27, which subtracts the two values from one another.

The quality measure Qinv for an assumed target track is calculated from a multiplicity of bearing angle differences in a quality measure unit 28, and the quality measure Qinv is then linked with the associated assumed target parameters, in a logic unit 29, to form a solution. These steps, which are carried out by the units 26 to 29, are repeated for each assumed target track, and the solutions obtained in this way are stored in a data memory. Impossible solutions are then eliminated in a first elimination unit 30, and solutions outside predetermined constraints are then eliminated in a second elimination unit 31.

After the elimination process, remaining solutions are then combined in a solution area unit 32 to form a solution area, which also images a multiplicity of assumed target tracks.

The solution area is preprocessed in a display unit 33 for graphical visualization of the quality measure as a function of the target parameters, and the quality measure values and target parameters that have been preprocessed in this way are displayed on a display apparatus 34. This representation of the solution area provides the operator with a "tool", which makes it possible for him to estimate at a glance how probable and reliable a specific solution is, in particular the solution which is automatically indicated to him as the best solution.

Furthermore, a reliability degree can automatically be determined from the solution area. The solution area unit 32 for this purpose transfers the solution area, that is to say the multiplicity of assumed possible solutions, with a quality measure which indicates a minimum quality, to a reliability indicator unit 35, which, for each target parameter type, that is to say for the target range, the target course and the target velocity, in each case calculates a reliability indicator from the position and distribution of the quality measures over the respective target parameters, that is to say over the target range, the target course and the target velocity. The reliability indicator unit in each case determines a value from the distribution of the target parameters for the multiplicity of possible solutions, which value allows a statement to be made about the reliability of the respective target parameter.

For example, reference is made to the target range in FIG. 7, at the top. High-quality solutions, for example solutions with an inverse quality measure of more than 0.8, occur in a range from about 12 to 14.5 km. These are distributed about a mean value of about 13.5 km. A reliability indicator $ZI_R$ for the target range calculates, for example, the following sum, or in the simplest case is equal to this sum:

$$\sum_{i,j} |R(i,j) - \overline{R}|$$

In this case, R(i,j) denotes the target range of the target track Z(i,j), and $\overline{R}$ denotes the mean value of the target ranges of all the target tracks Z(i,j) for all i and j.

The differences between the target range and their mean value are advantageously weighted with the inverse quality measure Qinv(i,j) associated with the respective target track, as a result of which the reliability indicator $ZI_R$ for the target range is determined using the following sum:

$$\sum_{i,j} Qinv(i,j) \cdot |R(i,j) - \overline{R}|$$

Instead of using the magnitude of the difference between the target range and the mean value of the target range, it is also possible to use the square of the respective target range, as a result of which the abovementioned term becomes:

$$\sum_{i,j} Qinv(i,j) \cdot (R(i,j) - \overline{R})^2$$

Furthermore, the reliability indicator unit 35 can normalize this reliability indicator for the target range such that reliability indicators formed analogously for the target course and the target velocity are comparable to one another. For this purpose, the difference is first of all made dimensionless by normalization with respect to the mean value of the target parameter, and the sum term is advantageously, but not necessarily, multiplied by a conversion constant $k_R$. The conversion constant $k_R$ is used to allow the reliability indicators of the various target parameters to be weighted differently, for example such that the reliability indicator for one of the target parameters has a higher significance than a reliability indicator of another target parameter. The reliability indicator $ZI_R$ for the target range is therefore given by:

$$k_R \cdot \sum_{i,j} Qinv(i,j) \cdot \left(\frac{R(i,j) - \overline{R}}{\overline{R}}\right)^2.$$

Analogously, the reliability indicator $ZI_C$ for the target course can be calculated using one of the following terms:

$$\sum_{i,j} |C(i,j) - \overline{C}|$$

$$\sum_{i,j} Qinv(i,j) \cdot |C(i,j) - \overline{C}|$$

$$\sum_{i,j} Qinv(i,j) \cdot (C(i,j) - \overline{C})^2$$

$$k_C \cdot \sum_{i,j} Qinv(i,j) \cdot \left(\frac{C(i,j) - \overline{C}}{\overline{C}}\right)^2$$

Furthermore, the reliability indicator for the target velocity $ZI_V$ can be determined in an analogous manner by the reliability indicator unit 35, on the basis of one of the following four terms:

$$\sum_{i,j} |V(i,j) - \overline{V}|$$

$$\sum_{i,j} Qinv(i,j) \cdot |V(i,j) - \overline{V}|$$

$$\sum_{i,j} Qinv(i,j) \cdot (V(i,j) - \overline{V})^2$$

-continued $$k_V \cdot \sum_{i,j} Qinv(i, j) \cdot \left(\frac{V(i, j) - \overline{V}}{\overline{V}}\right)^2$$

In alternative embodiments, the inverse quality measure Qinv(i,j) can in each case be squared in the abovementioned sum terms, that is to say they can be provided with the power of 2 or some other power, in order to further reduce the influence of solutions which are not as good.

The reliability indicators $ZI_R$, $ZI_C$, $ZI_V$ determined in this way are made available by the reliability indicator unit 35 to the reliability degree unit 36. Said unit determines the reliability degree ZG, for example using the following equation:

$$ZG = \max[ZI_R, ZI_C, ZI_V]$$

This means that the maximum value of the reliability indicators is determined for the target range, the target course and the target velocity. The maximum value is the worst value, and therefore indicates a measure of the unreliability, and therefore, conversely, also of the reliability of the solution area.

Alternatively, the reliability degree can also be determined from the mean value of the reliability indicators for the target parameters, for example using the following equation, $$ZG = \frac{1}{3} \cdot [ZI_R + ZI_C + ZI_V]$$

The reliability degree unit 36 therefore provides a reliability degree which is transferred to an assessment unit 37.

Furthermore, the assessment unit 37 receives the target parameters of target range, target course and target velocity of an optimized solution from a TMA unit 38. This TMA unit 38 determines this optimized solution for target parameters, for example according to DE 34 46 658 C2, DE 101 29 726 A1 or EP 1 531 339 A2.

The target parameters which have been determined in a conventional manner such as this are assessed in the assessment unit 37 by means of the reliability degree ZG from the reliability degree unit 36. In this case, the reliability degree may be output to the operator via a display apparatus, by means of a numerical value or a color code.

In this way, the operator is provided with information about the reliability of the solution which has been optimized on the basis of a predetermined optimization criterion.

Said units 26 to 38 are preferably programmed as an algorithm for a computer in the form of software. However, they may also be implemented in the form of hardware electronic circuits.

The invention is not restricted to the use of the method in carrier vehicles, in particular surface vessels or underwater vessels. In fact, the invention can also be used for fixed sonar installations, for example for monitoring coasts, waterways and/or harbor installations, or facilities installed on the high seas, such as oil drilling platforms, since the target parameters can be determined without the vehicle itself maneuvering.

All of the features stated in the above description and in the claims can be used according to the invention both individually and in any desired combination with one another. The invention is therefore not restricted to the described and claimed feature combinations. In fact, all combinations of individual features should be considered as having been disclosed.

The invention claimed is:

1. A method for passive determination of target parameters by directionally selective reception of sound waves which are emitted or transmitted by a target, by means of an arrangement (24) of waterborne sound sensors in a sonar receiving installation, in particular on a carrier vehicle, from estimated bearing angles which are determined from estimated positions of the target, and bearing angles which are measured by the arrangement (24) at the measurement location, wherein any bearing angle difference between measured and estimated bearing angles is minimized iteratively and, when the minimum is reached, the estimated position provides the target parameters of an optimized solution for an output of target range, target position, target course, and target velocity, which is updated during each processing cycle in a series of successive processing cycles, wherein a multiplicity of different target tracks (Z(i,j)) are calculated during each processing cycle from possible solutions for the target parameters to be determined ($R_{est}$, $C_{est}$, $V_{est}$), specifically an assumed target course ($C_{est}$), an assumed target range ($R_{est}$), and an assumed target velocity ($V_{est}$), in that associated bearing angles ($B_{est}$) are assumed from the measurement location for each of these possible solutions, in that a quality measure (Q, $Q_{inv}$) is calculated along each of the assumed target tracks (Z(i,j)) using the assumed bearing angles ($B_{est}$) and taking account of the bearing angles ($B_{meas}$) measured at the measurement location, and in that a reliability indicator ($ZI_R$, $ZI_C$, $ZI_V$) is in each case determined from the distribution of the quality measure (Q, $Q_{inv}$) over each target parameter ($R_{est}$, $C_{est}$, $V_{est}$) to be determined, and a reliability degree (ZG) is derived from the reliability indicators ($ZI_R$, $ZI_C$, $ZI_V$) of the respective target parameters ($R_{est}$, $C_{est}$, $V_{est}$) in order to determine the reliability of the optimized solution, which reliability degree is output by at least one of a numerical value or graphically via a display apparatus.

2. The method as claimed in claim 1, wherein the assumed target tracks (Z(i,j)) are determined as target tracks with a constant course and constant velocity, wherein a first bearing ray (1; 10), which is associated with a first bearing angle ($B_{meas\,first}$) measured at the measurement location of the sonar receiving installation, as well as a last bearing ray (2; 14), which is associated with a bearing angle ($B_{meas\,last}$) measured most recently at the measurement location of the sonar receiving installation are defined, wherein each assumed target track (Z(i,j)) starts at a start point on the first bearing ray (1; 10) and ends at an end point on the last bearing ray (2; 14), in that the start points of the target tracks on the first bearing ray and the end points of the target tracks (Z(i,j)) which start at the same start point on the last bearing ray (2; 14) are arranged at different ranges from the associated measurement location, in that target positions are assumed as a function of the assumed target velocity along the assumed target tracks and form assumed bearing rays with respect to the measurement locations, and assumed bearing angles ($B_{est}$) are determined therefrom.

3. The method as claimed in claim 2, wherein the first bearing ray (1; 10) and/or the last bearing ray (2; 14) are/is variable.

4. The method as claimed in claim 1, wherein the quality measure (Q) of an assumed target track (Z(i,j)) is calculated from the sum of the, in particular weighted, squares of differences of the assumed bearing angle ($B_{est}$) along the target track (Z(i,j)) and of the measured bearing angle ($B_{meas}$) associated with the same measurement location.

5. The method as claimed in claim 1, wherein the quality measure ($Q_{inv}$) of an assumed target track ($Z(i,j)$) is calculated from the inverted sum of the, in particular weighted, squares of the differences ($B_{meas}-B_{est}$) of the assumed bearing angle ($B_{est}$) along the target track ($Z(i,j)$) and of the measured bearing angle ($B_{meas}$) associated with the same measurement location, and the differences are multiplied by the smallest of these sums of all the assumed target tracks ($Z(i,j)$).

6. The method as claimed in claim 1, wherein a possible solution (15) is excluded if the associated target track does not intersect all the bearing rays associated with the measured bearing angles.

7. The method as claimed in claim 1, wherein a possible solution is excluded if it is outside one or more predetermined constraints of known extreme values of the target parameters.

8. The method as claimed in claim 1, wherein the reliability degree is determined to be "high" if all the respective target parameters of the solutions with a quality measure ($Q$, $Q_{inv}$) which indicates a minimum quality lie within a predetermined bandwidth around the mean value of the respective target parameter.

9. The method as claimed in claim 1, wherein, during each processing cycle, the target parameters of all solutions with a quality measure which exceeds a minimum quality are displayed by means of one or more two-dimensional diagrams of the quality measure ($Q$, $Q_{inv}$) over
   a) the assumed target course (C) and/or
   b) the assumed target range (R) and/or
   c) the assumed target velocity (V),
visualized graphically on a display apparatus (34).

10. The method as claimed in claim 1, wherein, during each processing cycle, the target parameters of all solutions with a quality measure which exceeds a minimum quality are displayed by means of one or more three-dimensional diagrams of the quality measure ($Q$, $Q_{inv}$) over
   a) the assumed target course (C) and the assumed target range (R) and/or
   b) the assumed target course (C) and the assumed target velocity (V), and/or
   c) the assumed target range (R) and the assumed target velocity (V), and/or
   d) the assumed target range (R), the assumed target course (C) and the assumed target velocity (V),
visualized graphically on a display apparatus (34).

11. The method as claimed in claim 1, wherein, during each processing cycle, the target parameters of all solutions with a quality measure which exceeds a minimum quality are displayed at least by means of four two-dimensional diagrams of the quality measure ($Q$, $Q_{inv}$), to be precise in each case over two target parameters (C, R; C, V; R, V) visualized graphically on a display apparatus (34), wherein the value of the quality measure ($Q$, $Q_{inv}$) is coded, in particular color-coded in accordance with a color scale.

12. The method as claimed in claim 1, wherein an expected region for which the quality measure ($Q$, $Q_{inv}$) reaches a minimum quality is calculated for each target parameter (C, R, V).

13. The method as claimed in claim 1, wherein the solution with the highest-quality measure (C, R, V) is marked.

14. The method as claimed in claim 1, wherein sound waves are received by means of a plurality of arrangements (24) of waterborne sound sensors, and bearing angles to a target are therefore measured from different measurement locations, and this plurality of bearing angles associated with one target are used to estimate a target position in the form of a cross-bearing, wherein a possible solution area for the possible solutions of the target parameters to be determined is restricted by means of this estimate.

15. The method as claimed in claim 1, wherein the frequencies of the sound waves which are incident from a measured bearing angle are measured, and these measured frequencies are used to estimate a target position, wherein a possible solution area for the possible solutions of the target parameters to be determined is restricted by means of this estimate.

16. An apparatus for passive determination of target parameters by directionally selective reception of sound waves which are emitted or transmitted by a target, by means of an arrangement (24) of waterborne sound sensors in a sonar receiving installation, in particular on a carrier vehicle, having a bearing installation for measurement of bearing angles ($B_{meas}$) in each processing cycle and having a TMA unit (38) for outputting an optimized solution for the target parameters (R, C, V), in that this optimized solution is updated iteratively during each processing cycle in a series of successive processing cycles from estimated bearing angles, which are determined from estimated positions of the target, and measured bearing angles,
   wherein a computation unit (26) for calculation of a multiplicity of target tracks ($Z(i,j)$) from possible solutions for the target parameters ($R_{est}$, $C_{est}$, $V_{est}$) to be determined, specifically an assumed target course ($C_{est}$), an assumed target range ($R_{est}$), and an assumed target velocity ($V_{est}$), as well as a reliability indicator unit (35) for determination of a reliability indicator ($ZI_R$, $ZI_C$, $ZI_V$) in each case from the distribution of the quality measure ($Q$, $Q_{inv}$) over each target parameter ($R_{est}$, $C_{est}$, $V_{est}$) to be determined along each assumed target track ($Z(i,j)$) from associated bearing angles ($B_{est}$) determined from the assumed target parameters ($R_{est}$, $C_{est}$, $V_{est}$), and from measured bearing angles ($B_{meas}$), a reliability degree unit (36) for determination of a reliability degree (ZG) from the reliability indicators ($ZI_R$, $ZI_C$, $ZI_V$) of the respective target parameters ($R_{est}$, $C_{est}$, $V_{est}$), and an assessment unit (37) for determination of the reliability of the optimized solution (R, C, V) by means of the reliability degree (ZG) which can be output in addition to the optimized solution (R, C, V) by at least one of a numerical value or graphically by a display apparatus.

* * * * *